Patented Dec. 22, 1953

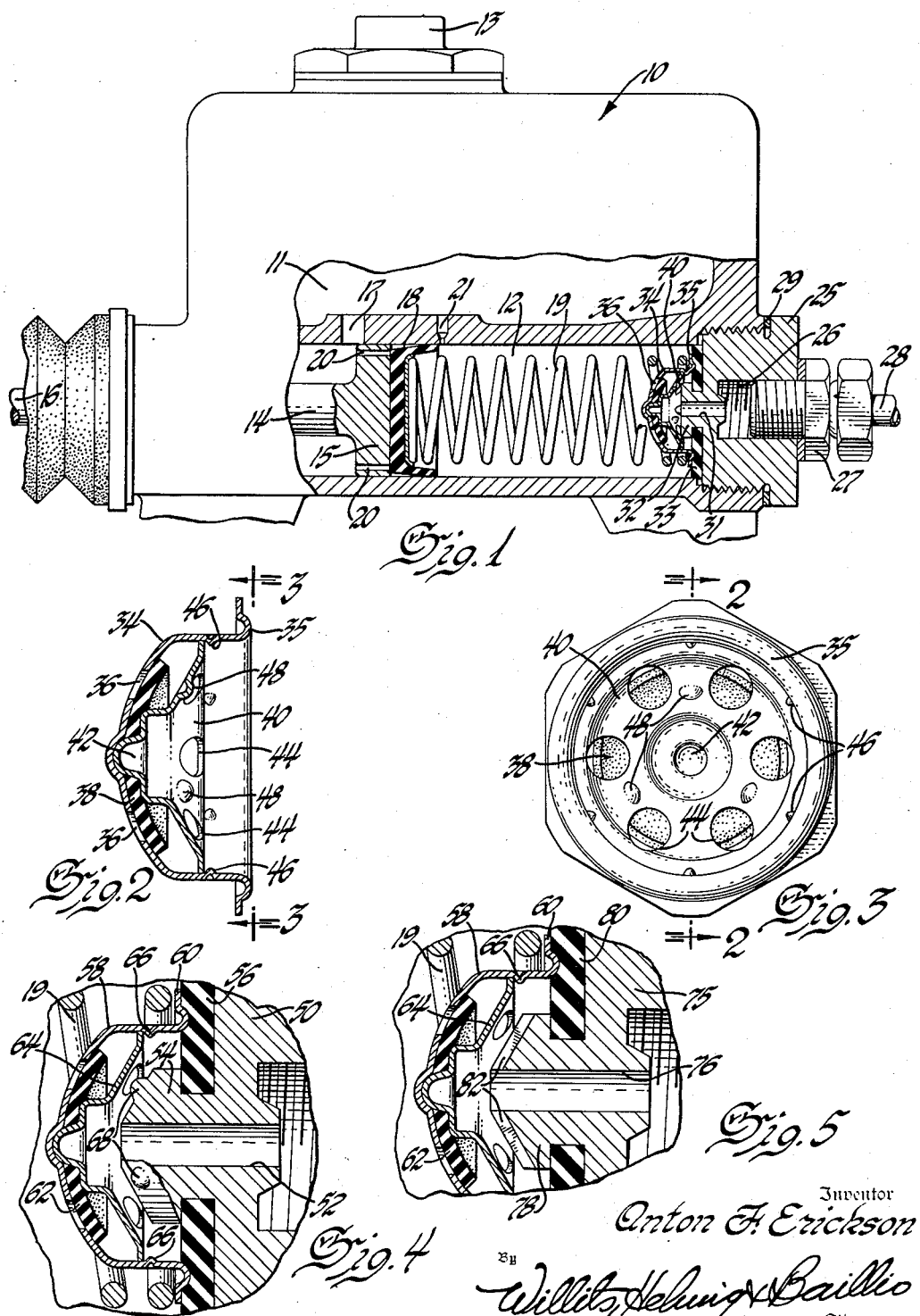

2,663,540

UNITED STATES PATENT OFFICE 2,663,540

CHECK VALVE FOR MASTER CYLINDERS

Anton F. Erickson, Dayton, Ohio, assignor to General Motors Corporation, Detroit, Mich., a corporation of Delaware Application August 24, 1949, Serial No. 111,998

6 Claims. (Cl. 251—119)

This invention relates to an improved hydraulic brake master cylinder, and more particularly, the invention is concerned with improved safety features of the master cylinder and valve at the outlet of the master cylinder.

The invention is illustrated on a hydraulic brake master cylinder which has a cage-type two-way check valve at the outlet. When the conventional master cylinder end plug, which has a shoulder surrounding the outlet passage to hold the valve seat in place, is employed with a cage-type valve, it is possible to accidentally seal the passage and prevent the operation of the brakes. This may happen if the valve cage becomes loose and moves within the valve frame. The cage will move under braking pressure and the cage will seat on the flange surrounding the outlet passage to block the flow of fluid to the brakes. The improved master cylinder and check valve has projections or depressions on either the flange of the master cylinder plug or the cage of the two-way check valve to prevent seating or sealing between these members to block the fluid passage to the brakes.

The primary object of this invention is to provide a master cylinder and cage-type check valve wherein the cylinder plug and the cage have complementary portions to prevent seating or sealing the passage and block the flow of fluid to the brakes.

Another object of the invention is to provide an improved master cylinder and check valve assembly in which a cage type two way check valve seats on a seal secured to the face of a plug by a flange surrounding the outlet passage and the complementary portions of the check valve cage or the plug flange have protuberances to prevent sealing if the check valve cage accidentally becomes loose within the check valve frame.

These and other objects of the invention will be more fully explained in the following description.

In the drawing, Figure 1 is a side elevation partly in section of a master cylinder of a hydraulic brake system.

Figure 2 is an enlarged cross section view of the valve at the outlet of the master cylinder.

Figure 3 is an end view as seen from the lines 3—3 of Figure 2.

Figure 4 is an enlarged fragmentary cross section showing the modified valve and a portion of the master cylinder.

Figure 5 is an enlarged fragmentary cross section showing another modification of the valve and a portion of the master cylinder.

Referring to the drawing, the master cylinder and reservoir unit 10 comprises a reservoir 11 overlying the cylinder 12. The reservoir has a conventional filler and breather cap 13. Slidable within the cylinder 12 is a piston 14 preferably of double headed form. The forward head 15 is shown in section. The piston is advanced by a piston rod 16 connected to the usual brake pedal. The piston 14, as shown in Figure 1, is in its fully retracted position and indicates the location of the passage 17 between the reservoir and the cylinder, which keeps the space on the low pressure side of the forward piston head 15 filled with fluid. A rubber cap seal 18 is positioned on the high pressure side of the piston and is held in contact with the piston head by the coil spring 19. During the retrograde movement of the piston fluid will flow through the passages 20 in the piston head and around the flexible seal to replace any fluid loss in the system. The bleed passage 21 provides communication between the reservoir and the cylinder when the piston is in its fully retracted position.

A plug 25 is secured in the discharge end of the cylinder by threads and has a threaded bore 26 in which is threadably secured a fitting 27 for the conduit 28, which provides an outlet passage for carrying the fluid to the wheel cylinders, not shown. A gasket 29 provides a seal between the shoulder of the plug 25 and the master cylinder housing 10. The central bore 26 or outlet passage has a reduced portion 31 which extends through a headed annular flange 32. A seal 33 made of rubber or other suitable material has a central aperture to fit around the flange 32 and beneath the head of the flange. The valve consisting of a cup-like frame 34 having a sealing flange 35 at the rim seating against the seal 33. The spring 19 which engages the piston cup seal 18 at one end engages the valve side of the sealing flange 35 at the other end and resiliently holds the valve in engagement with the seal 33. The inner end of the plug 25, including annular flange 32, constitutes a valve seat against which the sealing edge 35 of frame 34 is resiliently maintained through seal 33. The valve frame 34 has apertures 36 in the base portion which are covered by a valve member 38 preferably made of rubber. A cage member 40 has a centering protuberance 42 which fits into an aperture in the valve member 38 and holds it in position against the valve frame 34. The valve cage 40 has a generally obliquely extending flange with suitable apertures 44 for the flow of fluid. The flange of the cage 40 fits snugly within the frame 34 and is held in position by the staking protuberance 46.

Since it is possible that, due to hard usage, the check valve structure may fail in such a way that cage 40 would seat against the valve seat formed by the inner end of the plug 25 and particularly against flange 32, it is desirable to provide means to prevent a seal between the cage 40 and the headed flange 32 whereby flow through said cage apertures 44 would be blocked. One way in which such failure could occur is for the cage 40 to be loosened from the frame 34. As illustrated in Figure 2 this may be done by providing projections 48 on the lower face of the cage 40 in order to contact the headed flange 32 and hold it in spaced relation to the cage member.

In a modified form of the invention a plug 50 similar to plug 25 has an outlet passage 52 and a headed annular flange 54 to hold the seal 56 in position. The valve frame 58 has similar apertures and a flange 60 seating on the seal 56. The resilient valve member 62 seals the apertures in the valve frame 58 and is held in position by a cage 64 which has similar apertures and which is similarly secured within the valve frame 58 by staking projections 66. The obliquely extending flange of the cage 64 is smooth and engages projections 68 on the outer face of the headed flange 54. The projections 68 maintain the valve cage in spaced relation to the headed flange 54 and prevent seating and sealing which would block the outlet passage 52.

The plug may also be modified as has been shown in Figure 5, wherein the plug 75 has a central passage 76 extending through the center and terminating in the center of the headed flange 78, which secures the seal 80 in place. A valve 58 having the cage 64 as shown in Figure 4 is also employed with this modified master cylinder plug 75. The cage 64 has a smooth obliquely extended flange which is prevented from seating on and sealing when contacting the flange 78 by the radially extending recess 82 cut in the face of the headed flange 78.

The shock and stress that occur in normal usage of master cylinder check valves has been known to break the cage loose from the valve frame. With the usual valve cage construction the cage would be forced against the flange surrounding the outlet passage and form a seal which would prevent the flow of liquid to the brakes. Thus in accordance with the present invention the projections 48 have been placed on the check valve cage or the projections 68 or the depressions 82 have been placed on the flange surrounding the outlet passage to prevent the check valve cage from engaging and seating on the flange of the outlet plug. Thus even though the master cylinder check valve may be broken, the brakes will function, but merely with a reduced effectiveness or speed which will warn the operator to have repairs made.

The specific forms of the master cylinder and check valve are illustrative of the invention. It will be apparent that numerous modifications may be made within the scope of the appending claims.

I claim:

1. In a valve mechanism, a body having a passage, a valve seat having a port in said passage, a check valve having a cup-shaped frame, a plurally apertured cage element and a movable valve member, said cup-shaped frame including a base having a plurality of apertures therein, a sealing edge located adjacent the edge of the cup-shaped frame opposite from said base and adapted to engage said seat, said cage element being located within and secured to said cup-shaped frame member in spaced relation to said seat, said movable valve member being positioned between said frame and said cage element and normally biased to a position engaging said frame and covering said frame apertures to prevent flow from said port and said cage apertures through said frame apertures, said valve member being movable from said position to a valve open position to permit flow through said frame and cage apertures to said port, said cage apertures being disposed with respect to said movable valve member to permit free flow through said cage apertures at all times during normal operation, and cooperating surfaces and projections on the adjacent facing surfaces of said valve cage and said valve seat to prevent seating under all conditions of failure when said cage may contact with said seat to permit flow through said cage apertures in the valve open position.

2. In a valve mechanism, a body having a passage, a valve seat having a port in said passage, a check valve having a cup-shaped frame, a plurally apertured cage element and a movable valve member, said cup-shaped frame including a base having a plurality of apertures therein, a sealing edge located adjacent the edge of the cup-shaped frame opposite from said base and adapted to engage said seat, said cage element being located within and secured to said cup-shaped frame member in spaced relation to said seat, said movable valve member being positioned between said frame and said cage element and normally biased to a position engaging said frame and covering said frame apertures to prevent flow from said port and said cage apertures through said frame apertures, said valve member being movable from said position to a valve open position to permit flow through said frame and cage apertures to said port, said cage apertures being disposed with respect to said movable valve member to permit free flow through said cage apertures at all times during normal operation, and cooperating means in the adjacent facing surfaces of said valve cage and said valve seat to prevent seating under all conditions of failure when said cage may contact with said seat to permit flow through said cage apertures in the valve open position.

3. In a valve mechanism, a body having a bore, a spring seat in one end of said bore, a closure for the other end of said bore, a central port through said closure, a valve seat on the inner surface of said closure surrounding said port, a movable valve unit having a cup-shaped frame, a plurally apertured cage element and a movable valve member, said cup-shaped frame including a base portion having a plurality of apertures therein and a sealing edge adapted to engage said valve seat, a spring between said spring seat and said valve frame resiliently holding said sealing edge on said valve seat, said cage element being secured to the inner wall of and wholly contained within said cup-shaped frame, said cage element being adapted to secure said movable valve member between said cage and said frame, said movable valve member normally biased to close said apertures in said valve frame to prevent flow from said port through said base apertures and movable to a valve open position to permit flow through said base apertures towards said port, said cage apertures being disposed with respect to said movable valve member to permit free flow through said cage apertures at all times during normal operation, and cooperating surfaces and projections on the adjacent facing surfaces of said valve cage and said valve seat to prevent seating under all conditions of failure when said cage element may contact with the seat to permit flow through the cage apertures in said valve open position.

4. A check valve structure, said check valve having a cup-shaped frame, a cage element and a flexible valve member, said cup-shaped frame having a longitudinal axis, a base, a sealing edge located adjacent the edge of the cup-shaped frame opposite from said base, and a plurality of apertures in the base of the cup portion, said cage element having apertures and having each transverse dimension less than the corresponding transverse dimension of the sealing edge, said element being positioned transversely of said axis and secured entirely within said frame so that a portion of said frame and said sealing edge extend beyond said cage to longitudinally support said check valve structure, said flexible valve member being positioned between said frame and said cage element and normally biased to a position engaging said frame and covering the apertures in said frame to prevent flow from said cage apertures through said base apertures and movable toward a valve open position to permit flow through said base apertures toward said cage apertures, said cage apertures being spaced from said movable valve member to permit flow through said cage apertures at all times during normal operation, and projections on the outer transverse face of said cage element extending beyond the surface of said element whereby said projections will prevent said cage apertures from being closed by any cooperating valve supporting structure to permit flow through said cage apertures in the event of a failure of said check valve structure.

5. A check valve structure, said check valve including a cup-shaped frame, a cage element having a plurality of apertures therein and a movable valve member, said cup-shaped frame having a base, a sealing edge located adjacent the edge of the cup-shaped frame opposite from said base and a plurality of apertures in the base of the cup-shaped portion, said cage element being located entirely within and secured to said cup-shaped frame so that a portion of said frame and said sealing edge extend beyond said cage to longitudinally support said check valve structure, said movable valve member being positioned between said frame and said cage element and normally biased to a position engaging said frame and covering the apertures in said frame to prevent flow from said cage apertures through said base apertures and movable toward a valve open position to permit flow through said base apertures toward said cage apertures, said cage apertures being spaced from said movable valve member to permit flow through said cage apertures at all times during normal operation, and spaced projections on the outer surface of said cage element extending beyond the surface of said element whereby said projections will prevent said cage apertures from being closed by any cooperating valve supporting structure to permit flow through said cage apertures in the event of a failure of said check valve structure.

6. A check valve structure, said check valve having a cup-shaped frame, a cage element and a flexible valve member, said cup-shaped frame having a longitudinal axis, a base, a sealing edge located adjacent the edge of the cup-shaped frame opposite from said base and a plurality of apertures in the base of the cup portion, said cage element having apertures and having each transverse dimension less than the corresponding transverse dimension of the sealing edge, said element being positioned transversely of said axis and secured entirely within said frame so that a portion of said frame and said sealing edge extend beyond said cage to longitudinally support said check valve structure, said cage element securing said flexible valve member between the inner surface of said cage and said frame, said flexible valve member being positioned between said frame and said cage element so as to be normally biased to a position engaging said frame and covering the frame apertures to prevent flow from said cage apertures through said base apertures and movable toward a valve open position to permit flow through said base apertures toward said cage apertures, said cage apertures being disposed with respect to said flexible valve member to permit free flow through said cage apertures at all times during normal operation, and projections on the outer transverse face of said cage element extending beyond the surface of said element whereby the projections will prevent said cage apertures from being closed by any cooperating valve supporting structure to permit flow through said cage apertures in the event of a failure of said check valve structure.

ANTON F. ERICKSON.

References Cited in the file of this patent

UNITED STATES PATENTS

| Number | Name | Date |
| --- | --- | --- |
| 1,764,179 | Loughead | June 17, 1930 |
| 2,114,991 | Bowen | Apr. 26, 1938 |
| 2,128,050 | Landis | Aug. 23, 1938 |
| 2,174,503 | Whipple | Sept. 26, 1939 |
| 2,223,944 | Roy | Dec. 3, 1940 |
| 2,232,113 | Katcher | Feb. 18, 1941 |